Figure 1:
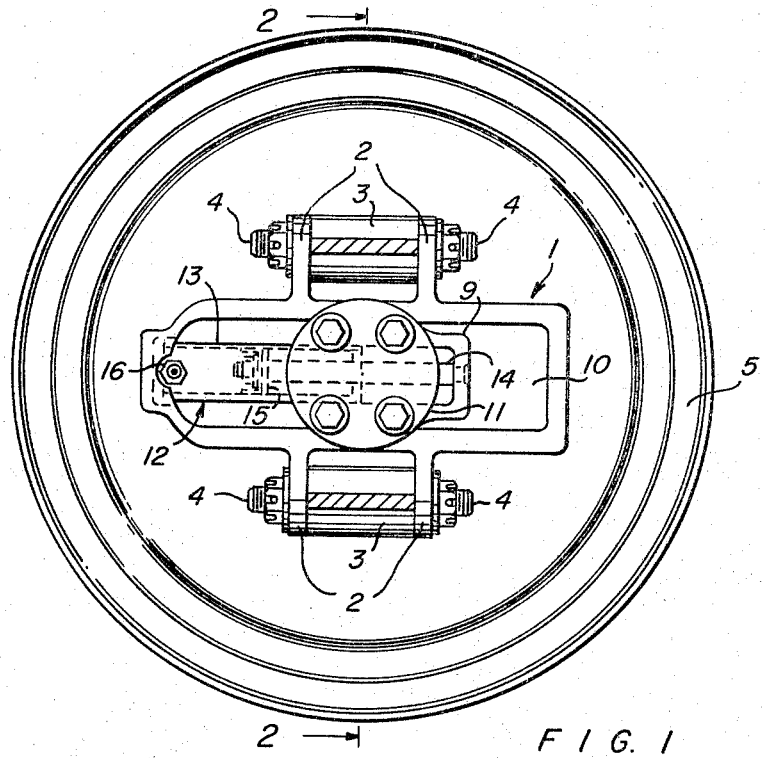

July 4, 1967  B. NODWELL ETAL  3,329,227
FRONT AXLE ADJUSTMENT

Original Filed May 15, 1964  2 Sheets-Sheet 1

INVENTORS
BRUCE NODWELL
& JOHN E. RYMES
BY *Smart & Biggar*
ATTORNEYS.

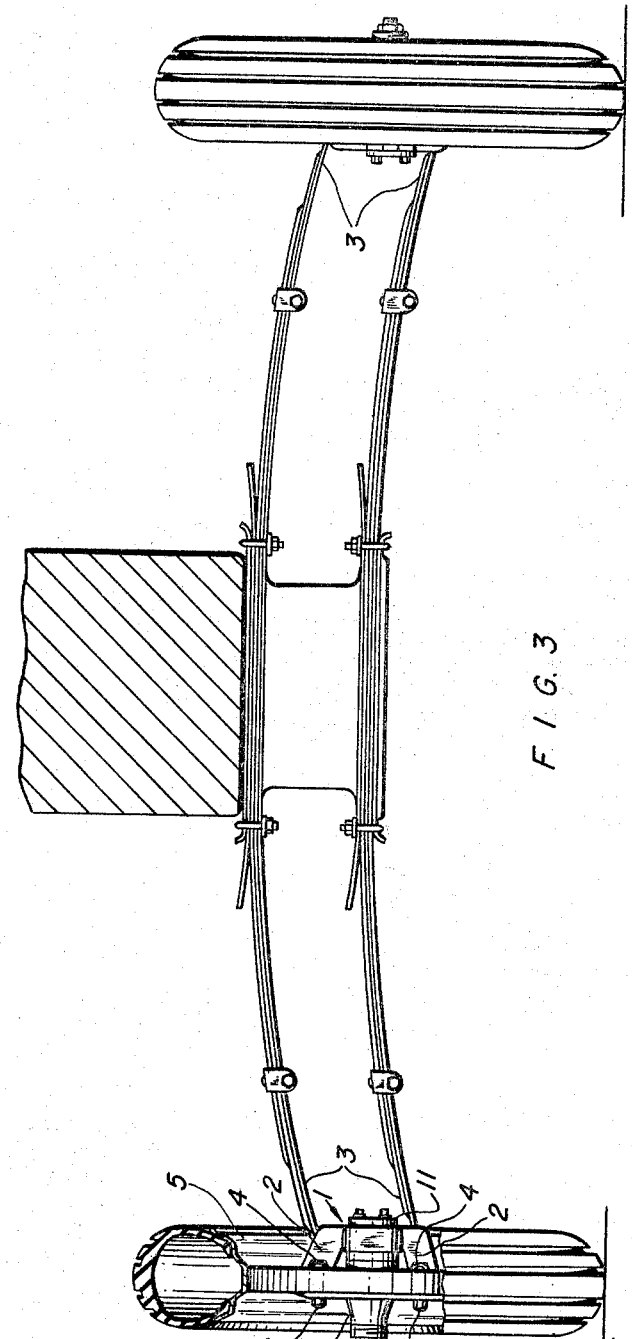

United States Patent Office 3,329,227
Patented July 4, 1967

3,329,227
FRONT AXLE ADJUSTMENT
Bruce Nodwell and John E. Rymes, Calgary, Alberta, Canada, assignors to Robin-Nodwell Mfg. Ltd., Calgary, Alberta, Canada
Continuation of application Ser. No. 367,821, May 15, 1964. This application Apr. 25, 1966, Ser. No. 549,767
9 Claims. (Cl. 180—9.6)

This application is a continuation of application Ser. No. 367,821, filed May 15, 1964.

The present invention relates to tracked vehicles. In particular, the present invention relates to tracked vehicles in which a pair of idler wheels are suspended from the chassis by a pair of substantially parallel spaced elliptical springs and each wheel of the pair is individually adjustable.

In tracked vehicles it is found to be generally desirable and in fact is common practice to have one pair of idler wheels independently adjustable so as to adjust the track on each side of the vehicle independently with respect to the other. Applicants have found that a particularly suitable suspension for the idler wheels, of tracked vehicles, is by a crossleaf suspension, i.e. by means of a pair of spaced elliptical spring means from the chassis of the vehicle. It has been found that this type of suspension is simple and highly suitably for the vehicle. However, the use of such a suspension does not allow for the individual adjustment of the wheels.

Applicants by the present invention provide for such a suspension a means whereby each wheel of a pair of opposite idler wheels suspended from the chassis of the tracked vehicle by means of a crossleaf suspension may be individually adjusted and as such each track of the vehicle separately adjusted.

According to the present invention therefore, there is provided a tracked vehicle in which one pair of opposite idler wheels is suspended from the chassis by means of a pair of spaced elliptical leaf spring means, each wheel being slidably mounted in a yoke connected between the adjacent ends of the spring means and means are provided for sliding said wheel in said yoke and releasably fixing said wheel in any desired position whereby each of said wheels may be independently adjusted so as to adjust the track passing over said wheels. Conventionally, each spring means normally comprises a stack of springs and desirably each spring means is formed by semi-elliptical springs forming a common axle for the idler wheels.

In a particular embodiment of the present invention each wheel of the pair of idler wheels is mounted on the spindle of a wheel hub which in turn is fixedly mounted on a member slidable in the ways of the slot of the yoke, the slidable member conveniently being rigidly fixed to the piston rod of a hydraulic ram, the cylinder of which is fixedly mounted to one end of the slot in the yoke and means such as a nipple is provided on the cylinder for the introduction of fluid under pressure into the cylinder so as to move the piston along the cylinder and thereby adjust the position of the wheel hub with respect to the yoke and locate said hub in any desired position. The fluid under pressure may suitably be provided from a grease gun, the grease being injected into the cylinder through the nipple.

Figure 2:
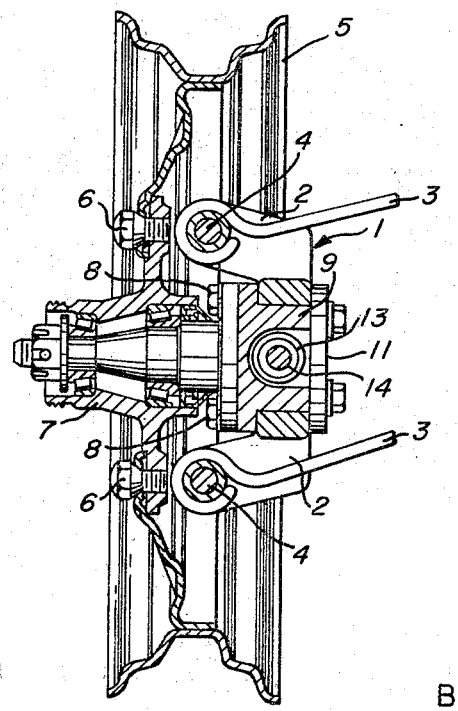

The present invention will be further illustrated by way of the accompanying drawings in which:

FIGURE 1 is a front elevation of the wheel suspension according to one embodiment of the present invention and, FIGURE 2 is a section taken along the line 2—2 in FIGURE 1, and FIGURE 3 is a front elevation fragmentary view showing the vehicle chassis in section.

With respect to the figures, a yoke 1 having bifurcated lugs 2 spans the ends of spring stacks 3, the ends of the spring stacks 3 being pivotably mounted on spindles 4 located between the lugs 2. An idler wheel 5 is mounted by means of bolts 6 on a hub and spindle assembly 7, the assembly 7 being bolted by bolts 8 to a bifurcated member 9 slidably mounted in the ways of the slot 10. A plate 11 is also bolted on to the bifurcated slidable member 9 to retain said member 9 in the slot 10. A hydraulic ram 12 is also located in the slot 10 of the yoke 1 and passes between the bifurcations of the bifurcations of the bifurcated member 9, the cylinder 13 of said ram being rigidly mounted at one end of the slot 10 and the piston rod 14 being rigidly mounted on the bifurcated member 9 whereby movement of the piston 15 along the cylinder 13 causes movement of the bifurcated member 9 along the slot 10 and thereby causes movement of the wheel 5. A nipple 16 is provided in the cylinder 13 whereby fluid under pressure e.g. grease from a grease gun may be injected into the cylinder 13 whereby to move the piston 15 in the cylinder 13.

It will be seen that by means of the present invention it is possible to suspend pairs of opposite idler wheels by means of a crossleaf suspension and at the same time maintain individual adjustment of the said idler wheels so as to be able to adjust individually the tracks of the tracked vehicle.

What we claim as our invention is:

1. A tracked vehicle in which at least one pair of opposite end wheels are suspended from the chassis by a pair of substantially parallel spaced elliptical leaf spring means extending transversely of the vehicle, each wheel being slidably mounted in a yoke having elongated guide ways connected between adjacent ends of the spring means and means are provided for sliding said wheel with respect to said yoke and releasably fixing said wheel in any desired position whereby each of said wheels is independently adjustable so that the tension of each track of the vehicle is independently adjustable.

2. A vehicle as claimed in claim 1 in which the end wheels are the front wheels.

3. A vehicle as claimed in claim 1 in which each spring means is formed of semi-elliptical springs providing a common axle for said wheels of the vehicle.

4. Adjustable suspension as claimed in claim 1 wherein said means for independently sliding said hub and spindle assembly comprises a fluid cylinder having a piston rod, said cylinder being connected to one of said hub and spindle assembly and yoke and said piston rod being connected to the other of said hub and spindle assembly and yoke.

5. A vehicle as claimed in claim 1 in which each wheel is mounted on a hub and spindle assembly, said assembly in turn being fixedly mounted upon a member slidable in said ways of said yoke, the slidable member being rigidly fixed to the piston rod of a hydraulic ram, the cylinder of which is fixedly mounted in said ways of said yoke, means being provided for the introduction under pressure of fluid into the cylinder to move the piston along the cylinder.

6. A vehicle as claimed in claim 5 in which a nipple is provided in the cylinder for introducing fluid under pressure.

7. An adjustable suspension for the hub and spindle assembly of a wheel for a tracked vehicle permitting individual adjustment of said wheel, comprising a yoke having elongated guide ways, said hub and spindle assembly being slidably mounted in said ways; means for suspension of said yoke on said vehicle consisting of spaced, substantially parallel, elliptical leaf spring means suspended from said vehicle and terminating in spaced free ends, said yoke being mounted on and extending between said free ends; and means for independently sliding said hub and spindle assembly in said yoke and releasably fixing said assembly in a desired position in said yoke.

8. Adjustable suspensions as claimed in claim 7 wherein said hub and spindle assembly is slidable substantially horizontally in said yoke.

9. An adjustable unit including a hub and spindle assembly of a wheel for a tracked vehicle permitting individual adjustment of said wheel, comprising a yoke having elongated guide ways, said hub and spindle assembly being slidably mounted in said ways and being restrained by said guide ways from pivotal movement with respect to said guide ways; transversely extending support means on said vehicle for attaching said yoke on said vehicle, said support means having a free end which is connected to said yoke at a location substantially on the vertical center line of said wheel; and mean attached to said yoke and to said hub and spindle assembly for independently sliding said hub and spindle assembly in said yoke and releasably fixing said assembly in a desired position in said yoke, said yoke, hub and spindle assembly, and said means for sliding said hub and spindle assembly being located within the confines of the wheel diameter.

References Cited

UNITED STATES PATENTS

| | | | |
|---|---|---|---|
| 1,361,047 | 12/1920 | Gregory | 180—48 |
| 1,583,157 | 5/1926 | Jett | 305—22 |
| 2,065,516 | 12/1936 | Dorst | 305—32 |
| 2,828,170 | 3/1958 | Badgley | 305—10 X |
| 3,013,843 | 12/1961 | Sinko | 305—10 |
| 3,082,043 | 3/1963 | Orton | 305—10 |

FOREIGN PATENTS

| | | |
|---|---|---|
| 125,142 | 6/1959 | Russia. |

BENJAMIN HERSH, *Primary Examiner.*

R. J. JOHNSON, *Assistant Examiner.*